US012732106B2

(12) United States Patent
Hsiao et al.

(10) Patent No.: US 12,732,106 B2
(45) Date of Patent: Sep. 8, 2026

(54) MULTI-PHASE VOLTAGE CONVERTER

(71) Applicant: Silergy Semiconductor Technology (Hangzhou) LTD, Hangzhou (CN)

(72) Inventors: Shengfu Hsiao, Kaohsiung City (TW); Chiachi Liu, Kaohsiung City (TW); Liwen Liu, Tainan City (TW); Jianan Pan, Keelung City (TW); Yajing Chen, Kaohsiung City (TW); Chen Zhao, Hangzhou (CN)

(73) Assignee: Silergy Semiconductor Technology (Hangzhou) LTD., Hangzhou (CN)

( * ) Notice: Subject to any disclaimer, the term of this patent is extended or adjusted under 35 U.S.C. 154(b) by 233 days.

(21) Appl. No.: 18/617,842

(22) Filed: Mar. 27, 2024

(65) Prior Publication Data

US 2024/0333161 A1 Oct. 3, 2024

(30) Foreign Application Priority Data

Mar. 28, 2023 (CN) ........................ 202310333207.X

(51) Int. Cl.
*H02M 3/158* (2006.01)
*H02M 1/00* (2006.01)
*H02M 1/08* (2006.01)

(52) U.S. Cl.
CPC ....... *H02M 3/1586* (2021.05); *H02M 1/0025* (2021.05); *H02M 1/082* (2013.01)

(58) Field of Classification Search
CPC .. H02M 3/1586; H02M 1/0025; H02M 1/082; H02H 3/253
See application file for complete search history.

(56) References Cited

U.S. PATENT DOCUMENTS 9,525,283 B2 12/2016 Xu
10,135,330 B2 11/2018 Zhang et al.
11,581,811 B2 2/2023 Hang et al.
11,818,815 B2 11/2023 Huang et al.
11,824,434 B2 11/2023 Yao et al.
2004/0208029 A1* 10/2004 Caruthers ............... H02J 1/102 363/72
2005/0088156 A1* 4/2005 Cheung ............... H02M 3/1584 323/282
2006/0212138 A1* 9/2006 Zhang ................. H02M 3/1584 713/300

(Continued)

*Primary Examiner* — Gary L Laxton

(57) ABSTRACT

A multi-phase voltage converter can include: a control chip configured to generate N pulse distribution signals, where N is a positive integer greater than 1; a power conversion module comprising N first-level conversion modules; where the first-level conversion module comprises at least one second-level conversion module, and the second-level conversion module comprises at least one third-level conversion module; where when the second-level conversion module comprises multiple third-level conversion modules, the multiple third-level conversion modules are coupled in parallel with each other; and where the first-level conversion module receives a corresponding one of the N pulse distribution signals, the second-level conversion module receives a first phase distribution signal generated based on the corresponding pulse distribution signal, and the third-level conversion module receives a second phase distribution signal generated based on the first phase distribution signal.

18 Claims, 8 Drawing Sheets

(56) References Cited

U.S. PATENT DOCUMENTS

| | | | | |
|---|---|---|---|---|
| 2007/0291520 | A1* | 12/2007 | Schuellein | H02M 1/0845 363/65 |
| 2010/0315052 | A1* | 12/2010 | Zambetti | H02M 3/1584 323/282 |
| 2018/0167028 | A1* | 6/2018 | Agarwal | H02S 40/38 |
| 2018/0351458 | A1 | 12/2018 | Chen et al. | |
| 2022/0209660 | A1 | 6/2022 | Sun et al. | |

* cited by examiner

MULTI-PHASE VOLTAGE CONVERTER

RELATED APPLICATIONS

This application claims the benefit of Chinese Patent Application No. 202310333207.X, filed on Mar. 28, 2023, which is incorporated herein by reference in its entirety.

FIELD OF THE INVENTION

The present invention generally relates to the field of power electronics technology, and more particularly to multi-phase voltage converters.

BACKGROUND

As the number of transistors on processing units and artificial intelligence (AI) chips, the density of transistors, and the frequency of transistors, increase, the power consumption of such chips also increases, which potentially increases heat dissipation issues. In order to reduce the chip power consumption, one approach is to reduce the power supply voltage required by the chip. On the other hand, the increase in the number of transistors in the chip leads to a continuous increase in the current demand of the chip. In addition, due to instruction cycle increases, the load transient slew rate of the chip may also increase. As the supply voltage required by the chip is reduced, the window for voltage deviation during load transient periods is reduced. Therefore, a voltage converter for supplying power to processing unit and AI chips should have low voltage, high current, fast load transient response, and strict voltage regulation.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

The number of phases of a multi-phase voltage converter is generally related to system power requirements. When the system power requirement is higher, the number of phases of the multi-phase voltage converter may also increase. In order to meet requirements of processing units and AI chips for high current and fast load transient response, the voltage converter can adopt a multi-phase converter. However, difficulties may persist with multi-phase voltage converter usage in high-phase number applications.

Figure 1:
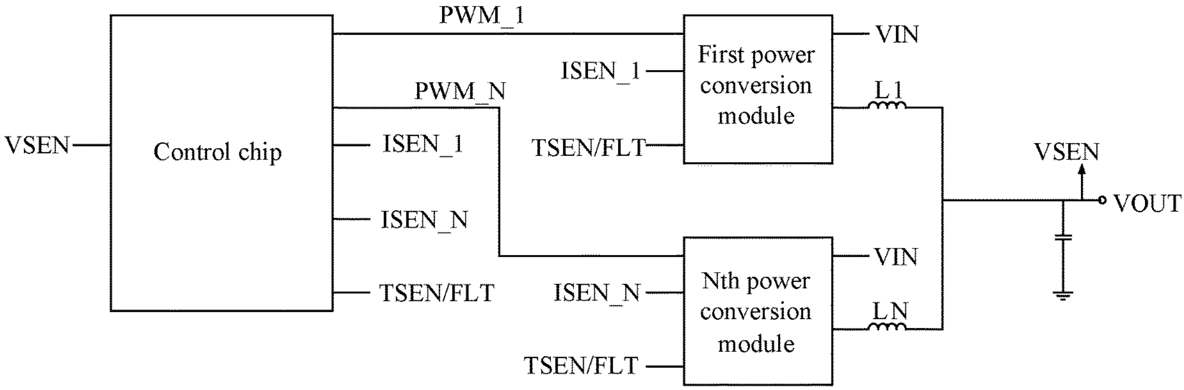
FIG. 1 is a schematic block diagram of an example voltage converter.

Referring now to FIG. 1, shown is a schematic block diagram of an example voltage converter. This example voltage converter is an N-phase buck converter, and the control chip of N-phase buck converter may need one output pin pulse-width modulation (PWM) and one sensing current input pin ISEN for each phase. As such, the control chip may need pins that are at least twice the total number of phases; that is, at least 2*N pins. In applications with a high number of phases, packaging costs of the control chip may also increase, and the wiring may become more complicated, thereby consuming more circuit area. Therefore, a traditional multi-phase voltage converter may not be scalable and suitable for high-phase high-power applications. In addition, if the traditional voltage converter has an error reporting function, the error reporting pin TSEN/FLT of each power converter may be connected together, and only the error of the voltage converter can be detected, but not which phase whereby the error occurs.

Figure 2:
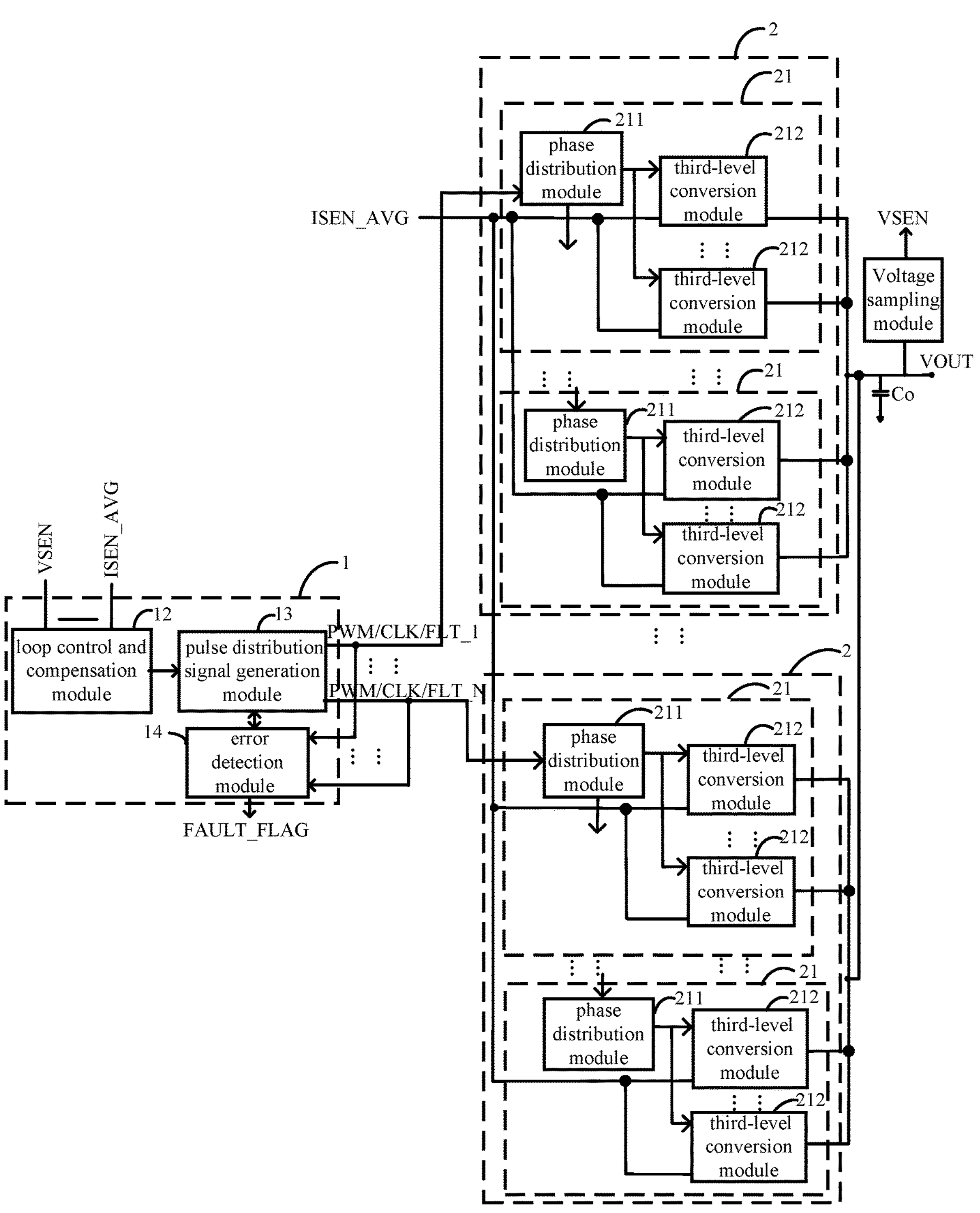
FIG. 2 is a schematic block diagram of a first example multi-phase voltage converter, in accordance with embodiments of the present invention.

Referring now to FIG. 2, shown is a schematic block diagram of a first example multi-phase voltage converter, in accordance with embodiments of the present invention. In this particular example, the voltage converter can include control chip 1 and a power conversion module. Control chip 1 can generate N pulse distribution signals, and the power conversion module can include N first-level conversion modules 2 connected in parallel. Here, N is a positive integer greater than 1. The power conversion module can include N first-level conversion modules 2 connected in parallel. Each first-level conversion modules 2 may receive a corresponding one of N pulse distribution signals. Each first-level conversion module 2 can include at least one second-level conversion module 21, and each second-level conversion module 21 can include at least one third-level conversion module 212. When second-level conversion module 21 includes multiple third-level conversion modules 212, multiple third-level conversion modules 212 can connect in parallel with each other. An input terminal of each first-level conversion module 2 may receive the corresponding pulse distribution signal, and an output terminal of the each first-level conversion module 2 can connect to output capacitor Co, in order to generate output voltage Vout.

Each first-level conversion module 2 can generate a first phase distribution signal according to the corresponding pulse distribution signal, and may generate at least one second phase distribution signal according to the corresponding first phase distribution signal. The number of the first-phase distribution signals can be the same number as the number of second-level conversion modules 21, and the number of the second-phase distribution signals the same number as the number of third-level conversion modules 212. Second-level conversion modules 21 may receive the corresponding first phase distribution signal, and third-level conversion modules 212 may receive the corresponding second-phase distribution signal.

In particular embodiments, when the second-level conversion modules in one first-level conversion module operate in the same phase, the first phase distribution signal can be consistent with (e.g., the same as or equal to) the corresponding pulse distribution signal, and the second-level conversion modules may receive the corresponding pulse distribution signal received by the corresponding first-level conversion module. When the third-level conversion modules in one second-level conversion module operate in the same phase, the second phase distribution signal can be consistent with the corresponding first phase distribution signal, and the third-level conversion modules may receive the corresponding first phase distribution signal received by the corresponding second-level conversion module. In this example, when each first-level conversion module 2 includes M second-level conversion modules 21, and each second-level conversion module 212 includes K third-level conversion modules 212, the multi-phase voltage converter can be expanded to N*K*M phases, and each of the pulse distribution signals can control K*M phases of the multi-phase voltage converter, thereby achieving applications of the multi-phases.

In particular embodiments, the third-level conversion module can include a control circuit and a power stage circuit. The control circuit can sample an inductor current of the power stage circuit, in order to generate a current sampling signal. The control circuit can also generate an average current signal at a first output terminal thereof according to the current sampling signal. The first output terminals of the control circuits of the third-level conversion modules in the power conversion module can connect together. Further, control chip 1 may receive the average current signal, and adjust the N pulse distribution signals based on the average current signal. The control circuit in each third-level conversion module can control at least one switch in the power stage circuit based on an error between the current sampling signal and the average current signal. For N*K*M phases of the multi-phase voltage converter, this approach may reduce the pins for receiving a current feedback signal. For example, control chip 1 may only need N output pins and one pins for receiving the current feedback signal.

In particular embodiments, control chip 1 can be integrated into one chip including N output pins PWM/CLK/FLT_1 to PWM/CLK/FLT_N for outputting N pulse distribution signals, one average current input pin ISEN_AVG for receiving the average current signal representing the average value of the inductor current of the power stage circuit generated by each of the third-level conversion modules, one output voltage feedback pin VSEN for receiving the voltage feedback signal that characterizes the output voltage of the multi-phase voltage converter, and one pin FAULT_FLAG for outputting the type of faults.

Control chip 1 can output one of N pulse distribution signals at each of N output pins to the corresponding first-level conversion module according to the voltage feedback signal and the average current signal. In this example, the power conversion module can include N first-level conversion modules 2 connected in parallel. Each of first-level conversion modules 2 may receive a corresponding one of N pulse distribution signals. Each first-level conversion module 2 can include at least one second-level conversion module 21, and each second-level conversion module 21 can include at least one third-level conversion module 212. When second-level conversion module 21 includes multiple third-level conversion modules 212, multiple third-level conversion modules 212 can connect in parallel with each other. In each second-level conversion module 21, third-level conversion module 212 may receive the second phase distribution signal generated based on the first phase distribution signal.

Figure 3:
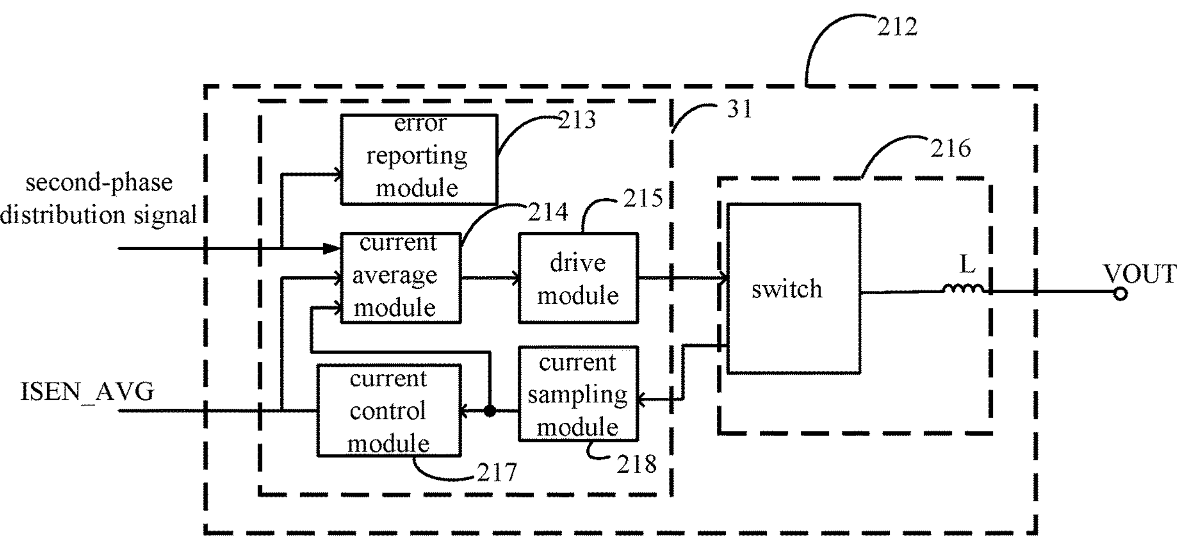
FIG. 3 is a schematic block diagram of an example third-level conversion module, in accordance with embodiments of the present invention.

Referring now to FIG. 3, shown is a schematic block diagram of an example third-level conversion module, in accordance with embodiments of the present invention. In this particular example, each third-level conversion module 212 can include control circuit 31 and power stage circuit 216. Control circuit 31 can control power stage circuit 216 based on the corresponding second phase distribution signal to generate output voltage Vout. Output terminals of all power stage circuits 216 can connect together to output capacitor Co, which may serve as an output terminal of the multi-phase voltage converter.

In particular embodiments, control circuit 31 can include current average module 217. Current average module 217 may receive the current sampling signal characterizing the inductor current of the corresponding power stage circuit 216, and perform an averaging operation for the current sampling signal, in order to generate the average current signal. For example, the average current signal can be output to a terminal of control circuit 31. For example, the current sampling signal can be configured as a triangle wave signal, the current average module may perform an averaging operation for the triangle wave signal, in order to generate the average current signal. In this example, the current average module can include a resistor. One terminal of the resistor may receive the current sampling signal, and the other terminal of the resistor can generate the average current signal. The first output terminals of all the control circuits can connect together. As such, the control chip may only need one average current input pin ISEN_AVG for receiving the average current signal characterizing an average value of an inductor current of a power stage circuit generated by each of the third-level conversion modules, thereby reducing pins for receiving the current feedback signal and decreasing the cost of package.

In particular embodiments, control circuit 31 can include current control module 214. Current control module 214 may receive the second phase distribution signal, the current sampling signal, and the average current signal, and can control the at least one switch in power stage circuit 216 to be turned on or off based on the error between the current sampling signal and the average current signal.

In particular embodiments, control circuit 31 can include drive module 215 for generating a drive signal to control the at least one switch in power stage circuit 216. In this example, the first output terminals of the control circuits can connect together to generate the average current signal characterizing an average value of an inductor current of a power stage circuit generated by each of the third-level conversion modules. An input terminal of each current average module 217 may receive the current sampling signal characterizing the inductor current of the corresponding power stage circuit 216, in order to generate the average current signal. Current control module 214 may receive the second phase distribution signal generated by the first pulse distribution signal, and can generate a switch control signal to control the at least one switch in power stage circuit 216 based on the error between the current sampling signal and the average current signal. As such, the output currents of the power stage circuits can be equal, and current sharing achieved. Drive module 215 may receive the switch control signal generated by current control module 214, and generate a drive signal for controlling the switch in the power stage circuit.

In the examples above, each third-level conversion module in the multi-phase voltage converter can be internally installed the current average circuit, and the second phase distribution signal adjusted according to the current sampling signal of the inductor current of each third-level conversion module 212 and the average current signal characterizing the average value of inductor current of power stage circuits 216. In this way, current sharing can be realized, such that each third-level conversion module 212 may achieve current sharing, and whereby the multi-phase voltage converter is more accurate than the traditional multi-phase voltage converter in FIG. 1.

As shown in FIG. 3, third-level conversion module 212 can also include current sampling module 218. Current sampling module 218 may obtain the current sampling signal that characterizes the inductor current of power stage circuit 216 by sampling. Power stage circuit 216 can include switches and an inductor. In other examples, switches and a capacitor can also be included. Further, when first-level conversion modules 2 includes multiple second-level conversion modules 21, multiple first-phase distribution signals can be generated based on the same pulse distribution signal. Also, the number of the first-phase distribution signals may be the same number as the number of second-level conversion modules 21, such that each second-level conversion module 21 performs power conversion according to a corresponding one of the first-phase distribution signals. When second-level conversion modules 21 includes multiple third-level conversion modules, multiple second-phase distribution signals can be generated based on the corresponding one of the first-phase distribution signals. Also, the number of the second-phase distribution signals may be the same number as the number of third-level conversion modules 212, such that each third-level conversion module 212 performs power conversion according to a corresponding one of the second-phase distribution signals.

In particular embodiments, first-level conversion module 2 can include a divider. The divider may receive a corresponding one of the pulse distribution signals to generate multiple first-phase distribution signals. Also, second-level conversion module 21 may receive a corresponding one of the first-phase distribution signals. When third-level conversion modules 212 in one second-level conversion module 21 operates in the same phase, each third-level conversion modules 212 may receive a corresponding one of the first-phase distribution signals. When the third-level conversion modules 212 in one second-level conversion module 21 operate in interleaved phase, second-level conversion modules 21 can also include a divider. The divider may receive a corresponding one of the first phase distribution signals to generate multiple second-phase distribution signals, and each third-level conversion module 212 may receive a corresponding one of the second-phase distribution signals.

In another example (see, e.g., FIG. 2), each second-level conversion module 21 can include phase distribution module 211. Also, second-level conversion modules 21 in one first-level conversion module 2 can operate in the manner of the same phase or the interleaved phase. When second-level conversion modules 21 operates in interleaved phase, phase distribution modules 211 in second-level conversion modules 21 can connect in series with each other. Each of the phase distribution modules 211 may perform a phase shift or pulse extraction based on the pulse distribution signal received by first-level conversion module 2, in order to obtain the corresponding first phase distribution signal of the second-level conversion module 21. When second-level conversion modules 21 operates in the same phase, phase distribution module 211 may be used for signal transmission, and the input and output signals of phase distribution module 211 the same (e.g., both being the pulse distribution signal received by first-level conversion module 2). In this example, phase distribution module 211 in the first second-level conversion module 21 may have an input terminal for receiving a corresponding one of the pulse distribution signals, and an output terminal for connecting to an input terminal of the phase distribution module 211 in the second second-level conversion module 21, and so on. Thus, phase distribution module 211 in the (N−1)-th second-level conversion module 21 may have an output terminal for connecting to an input terminal of the phase distribution module 211 in the N-th second-level conversion module 21. Each phase distribution module 211 may receive an output signal of phase distribution module 211 in the last second-level conversion module 21 as the first phase distribution signal. Also, phase distribution module 211 in the first second-level conversion module 21 may receive a corresponding one of the pulse distribution signals as the first phase distribution signal.

In particular embodiments, third-level conversion module 212 may also include a phase distribution module, and the third-level conversion modules 212 in second-level conversion module 21 can operate in the same phase or in interleaved phase. When the third-level conversion modules 212 operate in interleaved phase, the phase distribution modules in the third-level conversion modules 212 of the second-level conversion module 21 can connect in series with each other. Also, each of the phase distribution modules may perform phase shift or pulse extraction based on the first phase distribution signal received by second-level conversion module 21, in order to generate a second phase distribution signal of the corresponding third-level conversion module. When third-level conversion modules 211 operates in the same phase, the phase distribution module in the third-level conversion modules 212 may be used for signal transmission, and the input and output signals of each phase distribution module can be the same (e.g., both being the first phase distribution signal received by the second-level conversion module 21). In FIGS. 2 and 3, the output terminal of each phase distribution module in the second-level conversion module can be directly connected to the corresponding third-level conversion module. In particular embodiments, power stage circuit 216 can be a BUCK circuit, a BOOST circuit, a switched capacitor circuit, or any suitable converter.

In certain embodiments, the multi-phase voltage converter may have a fault detection function, which can detect which phase has a fault in time, and control the operating mode of the multi-phase voltage converter according to the type of the fault. When a fault occurs, first-level conversion module 2 may stop power conversion, and the power conversion module may transmit the fault information to the control chip through signal lines transmitting the N pulse distribution signals. As shown in FIG. 3, control circuit 31 in the third-level conversion module 212 can also include error reporting module 213. For example, error reporting module 213 can monitor the temperature, current, voltage, open circuit, and/or short circuit of third-level conversion module 212, as well as the temperature, current, voltage or interface output states, and/or other states of each sub-module in third-level conversion module 212. When a fault occurs, control chip 1 can stop transmitting the pulse distribution signal. At this time, the signal line transmitting the first phase distribution signal, the signal line transmitting the second phase distribution signal, and the signal line transmitting the pulse distribution signal, can be reused to communicate the fault types.

According to the type of the fault, the power conversion module can modify the electrical signals on the signal lines transmitting the pulse distribution signals along the signal lines transmitting the second and first phase distribution signals, in order to transmit different electrical signals to control chip 1. In particular embodiments, according to the type of the fault, third-level conversion modules can transmit different electrical signals to control chip 1 by connecting the signal lines of transmitting second phase distribution signals to different electrical signals. As an example, according to the type of the fault, the signal line transmitting the second phase distribution signal can correspond to different electrical signals, such as different resistances, currents, or voltages.

As shown in FIG. 2, control chip 1 can include loop control and compensation module 12 and pulse distribution signal generation module 13. Loop control and compensation module 12 can perform loop control, compensation, and protection based on the average current signal characterizing the average value of the inductor current of the power stage circuit, and the voltage feedback signal characterizing the output voltage of the multi-phase voltage converter. Pulse distribution signal generation module 13 can generate N pulse distribution signals according to the output signal of loop control and compensation module 12. It should be understood that according to the composition of pulse distribution signal generation module 13, the pulse distribution signal can have different forms in certain embodiments. For example, the pulse distribution signal can be a pulse-width modulation (PWM) signal or a clock signal. The clock signal can be used to indicate that the switch in the power stage circuit is turned on when the conduction time of the switch is constant, or may simply be a clock signal with a fixed frequency.

As shown in FIG. 2, control chip 1 can also include error detection module 14. Error detection module 14 can determine which first-level conversion modules 2 occurs fault by monitoring the electrical signals on the signal lines transmitting the N pulse distribution signals, and may detect the type of the fault. For example, error detection module 14 can determine which first-level conversion modules 2 occurs fault by detecting the resistor, current, and/or voltage on the signal lines.

Figure 4:
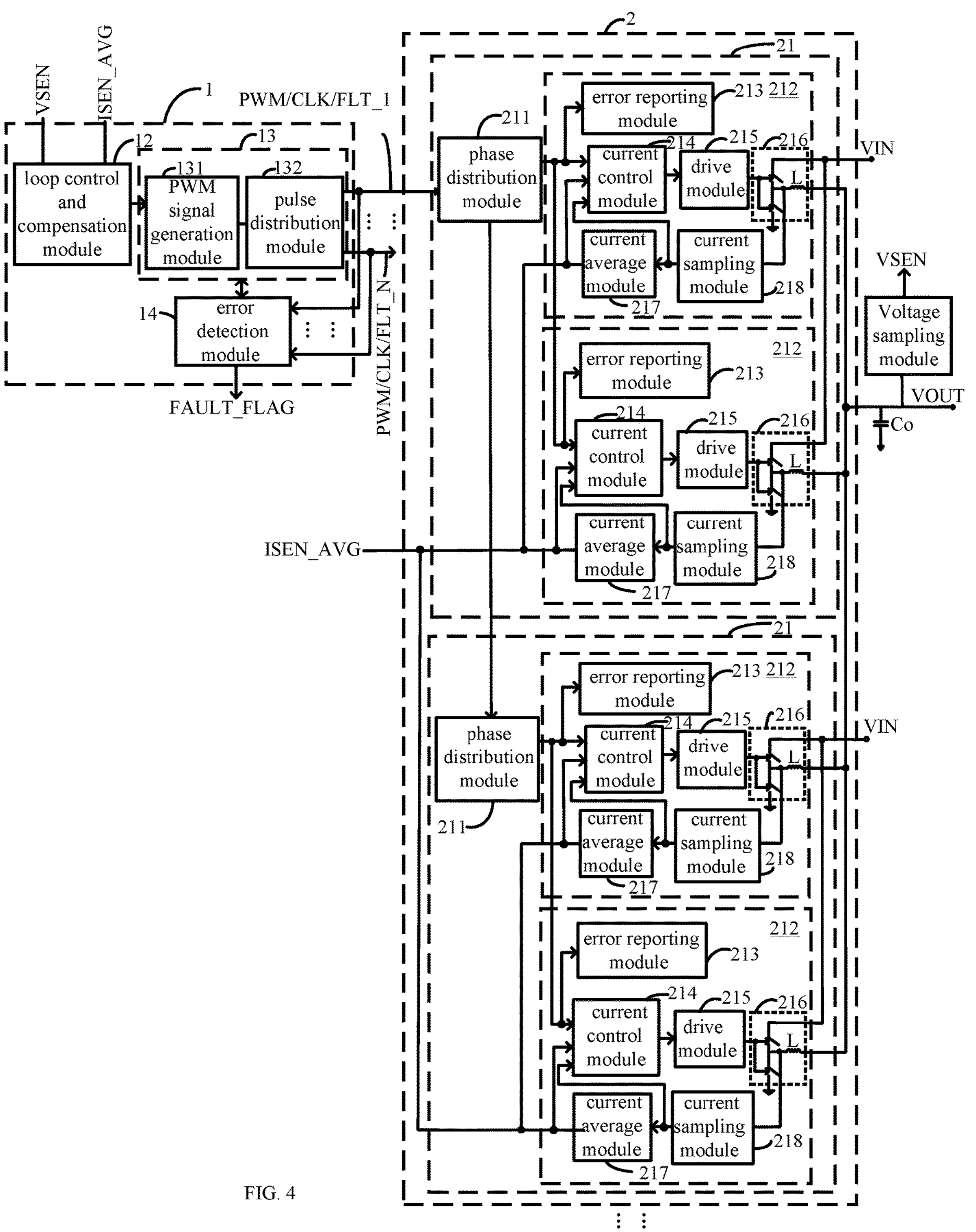
FIG. 4 is a schematic block diagram of a second example multi-phase voltage converter, in accordance with embodiments of the present invention.

Referring now to FIG. 4, shown is a schematic block diagram of a second example multi-phase voltage converter, in accordance with embodiments of the present invention. In this particular example, control chip 1 can generate a PWM signal as the pulse distribution signal. Pulse distribution signal generation module 13 can include PWM signal generation module 131 and pulse distribution module 132. PWM signal generation module 131 can generate a PWM signal according to the output signal of the loop control and compensation module 12, and pulse distribution module 132 can distribute the pulses in the PWM signal, in order to generate N interleaved pulse distribution signals.

When the pulse distribution signal is configured as a PWM signal, current control module 214 in the third-level conversion module can adjust of the drive signal of the power stage circuit. In one example, current control module 214 in the third-level conversion module can generate the switch control signal by adjusting the second phase distribution signal based on the error between the current sampling signal and the average current signal. Drive module 215 may receive the switch control signal and generate the drive signal to drive the switch in power stage circuit 216 for power conversion, thereby controlling the turn-on or turn-off time of the switch in the power stage circuit, and driving the switch in power stage circuit 216 to perform power conversion.

Figure 5:
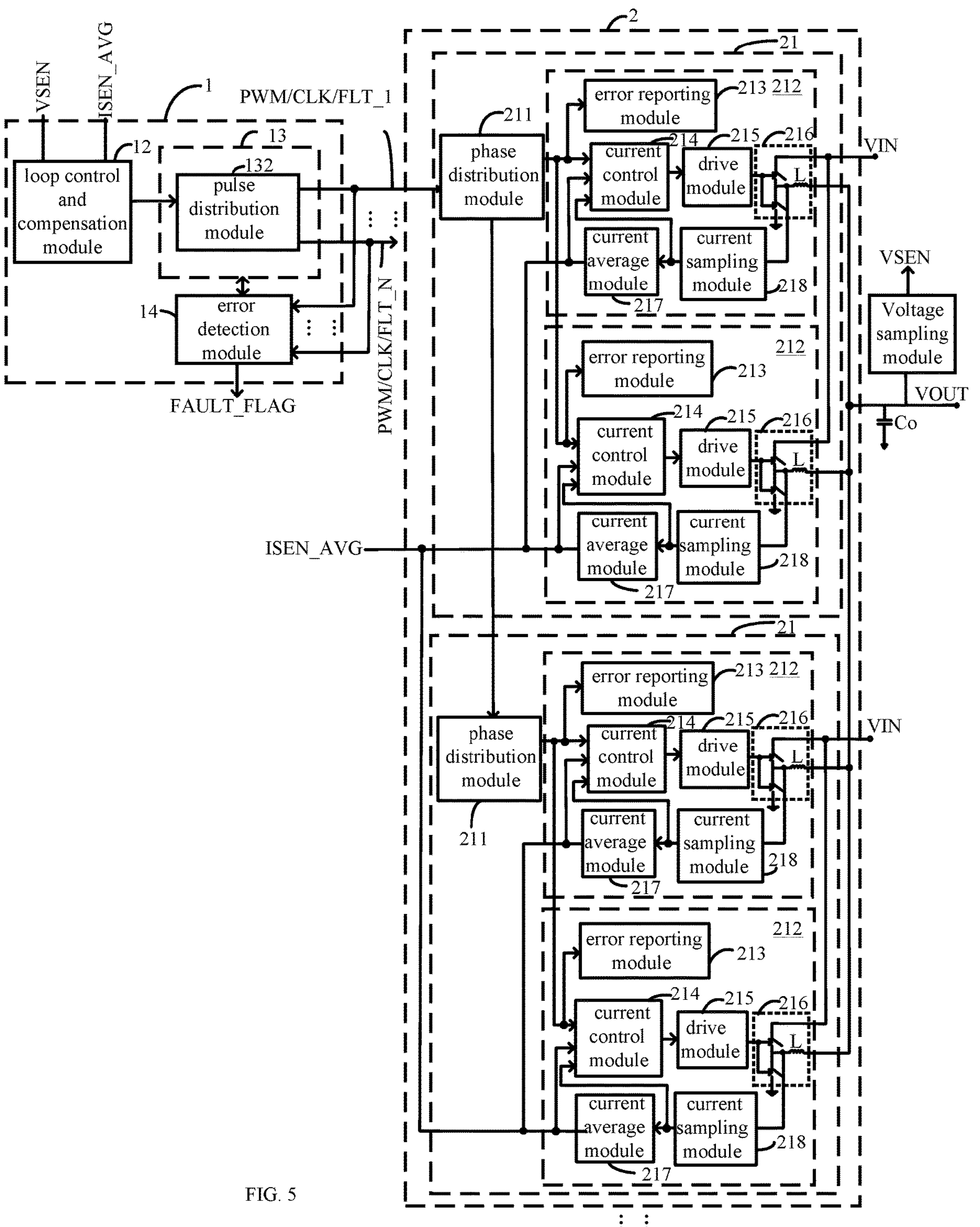
FIG. 5 is a schematic block diagram of a third example multi-phase voltage converter, in accordance with embodiments of the present invention.

Referring now to FIG. 5, shown is a schematic block diagram of a third example multi-phase voltage converter, in accordance with embodiments of the present invention. In this particular example, control chip 1 can generate a clock signal as the pulse distribution signal. Pulse distribution signal generation module 13 can include pulse distribution module 132. Pulse distribution module 132 can distribute the output signal of loop control and compensation module 12 to generate N interleaved pulse distribution signals.

Current control module 214 in the third-level conversion module can adjust and generate the drive signal of the power stage circuit. In one embodiment, current control module 214 in the third-level conversion module can adjust a reference signal representative of the turn-on or turn-off time of the switch in the power stage circuit based on the error between the current sampling signal and the average current signal. Current control module 214 may generate a PWM signal as the switch control signal based on the adjusted reference signal and the corresponding second phase distribution signal. Drive module 215 may receive the switch control signal and generate the drive signal to drive the switch in power stage circuit 216 for power conversion, thereby controlling the turn-on or turn-off time of the switch in the power stage circuit, and drive the switch in power stage circuit 216 to perform power conversion.

It should be understood that when the pulse distribution signal generated by pulse distribution signal generation module 13 is a PWM signal, there are many suitable control modes for loop control and compensation module 12 to generate the PWM signal, such as constant frequency control, constant on-time control, and constant off-time control. When the pulse distribution signal generated by pulse distribution signal generation module 13 is a clock signal, there are also many suitable ways for loop control and compensation module 12 to generate the clock signal. In the constant frequency control mode, loop control and compensation module 12 can generate the clock signal with a predetermined frequency. In the ripple-based constant on-time control mode, loop control and compensation module 12 can generate a set signal for indicating the turn-on time of the switch as the clock signal.

In particular embodiments, the signal lines for transmitting the pulse distribution signal can be multiplexed to detect fault signals generated by each first-level conversion module, and this can greatly reduce the number of pins of control chip 1. In other examples, the error detection may not be performed by multiplexing the signal lines for transmitting the pulse distribution signals, but the number of pins of the control chip may be increased. The error detection function of this example can detect which first-level conversion module is faulty. The example multi-phase voltage converter shown in FIG. 1 may only determine that conversion module has a fault, but not which phase conversion module is faulty.

Therefore, the error detection function of particular embodiments is more targeted than approaches of other voltage converters.

Each third-level conversion module in the multi-phase voltage converter can be internally installed the current average circuit. Also, the output terminals of the current average circuits of the third-level conversion module can connect together to pin ISEN_AVG. the average current signal characterizing the average value of the inductor current of the power stage circuits can be generated, and the average current signal at pin ISEN_AVG fed back to control chip 1, in order to realize functions such as loop control and protection. Because the average current signal is normalized information, as compared to the example multi-phase voltage converter in FIG. 1, the multi-phase voltage converter of particular embodiments is easier to control and the peripheral circuits are more streamlined.

It should be understood that the number of second-level conversion modules 21 in each first-level conversion module 2 can be the same or different as those shown herein. Similarly, the number of third-level conversion modules 212 in each second-level conversion module 21 may be the same or different to those shown herein. Also for example, second-level conversion module 21 in the first-level conversion module 2 can operate in the same phase or in interleaved phase, and third-level conversion modules 212 in second-level conversion module 21 can operate in the same phase or in interleaved phase.

In one embodiment (see, e.g., FIG. 2), control chip 1 can be integrated into one chip including N output pins PWM/CLK/FLT_1-PWM/CLK/FLT_N for outputting N pulse distribution signals. One average current input pin ISEN_AVG can receive the average current signal representing the average value of the inductor current of the power stage circuit generated by each of the third-level conversion modules. One output voltage feedback pin VSEN can receive the voltage feedback signal that can characterize the output voltage of the multi-phase voltage converter. Output voltage feedback pin VSEN can connect to the output terminal of the voltage sampling module. Also, one pin FAULT_FLAG can output the type of faults detected by error detection module 14.

As an example, each of second-level conversion module 21 (except, e.g., the output inductor and output capacitor of each power stage circuit 216) may be integrated into a chip. The chip can include a signal receiving pin for receiving the pulse distribution signal, a power input pin for supplying power to the chip, an average current output pin for receiving an average current signal characterizing an average value of an inductor current of a power stage circuit generated by each of the third-level conversion modules in one second-level conversion module, and multiple output pins connecting to the output capacitor or the output inductor of each power stage circuit. As another example, at least one third-level conversion module 212 (except, e.g., the output inductor and output capacitor of power stage circuit 216) in the same second-level conversion module can be integrated into a chip. The chip can include a signal receiving pin for receiving the second phase distribution signal generated by the pulse distribution signal, a power input pin for supplying power to the chip, an average current output pin for generating the average current signal characterizing an average value of an inductor current, and at least one output pin for connecting to the output capacitor or output inductor of the power stage circuit.

In particular embodiments, the multi-phase voltage converter can be configured as a modular power supply architecture, and the number of the first-level conversion modules, the second-level conversion modules, and the third-level conversion modules, can be designed and expanded according application requirements. Control chip 1 can manage N groups of interleaved and parallel-connected first-level conversion modules, and the number of pins required for control chip 1 to transmit the pulse distribution signals and the current feedback signal (e.g., average current signal) can be (N+1). In one example, when in each first-level conversion module 2, M second-level conversion modules 21 connected in parallel may operate in interleaved phase. Also, in each second-level conversion module 212, K third-level conversion modules 212 connected in parallel may operate in interleaved phase. The example multi-phase voltage converter in FIG. 1 may need N*M*K*2 pins for transmitting the pulse distribution signals and the current feedback signal. In this way, for the same number of phases of the conversion modules, the number of the pins in particular embodiments is greatly decreased. Therefore, under applications of high phase number, the package size cost of control chip 1 is lower and more competitive, and the layout and routing easier.

Figure 6:
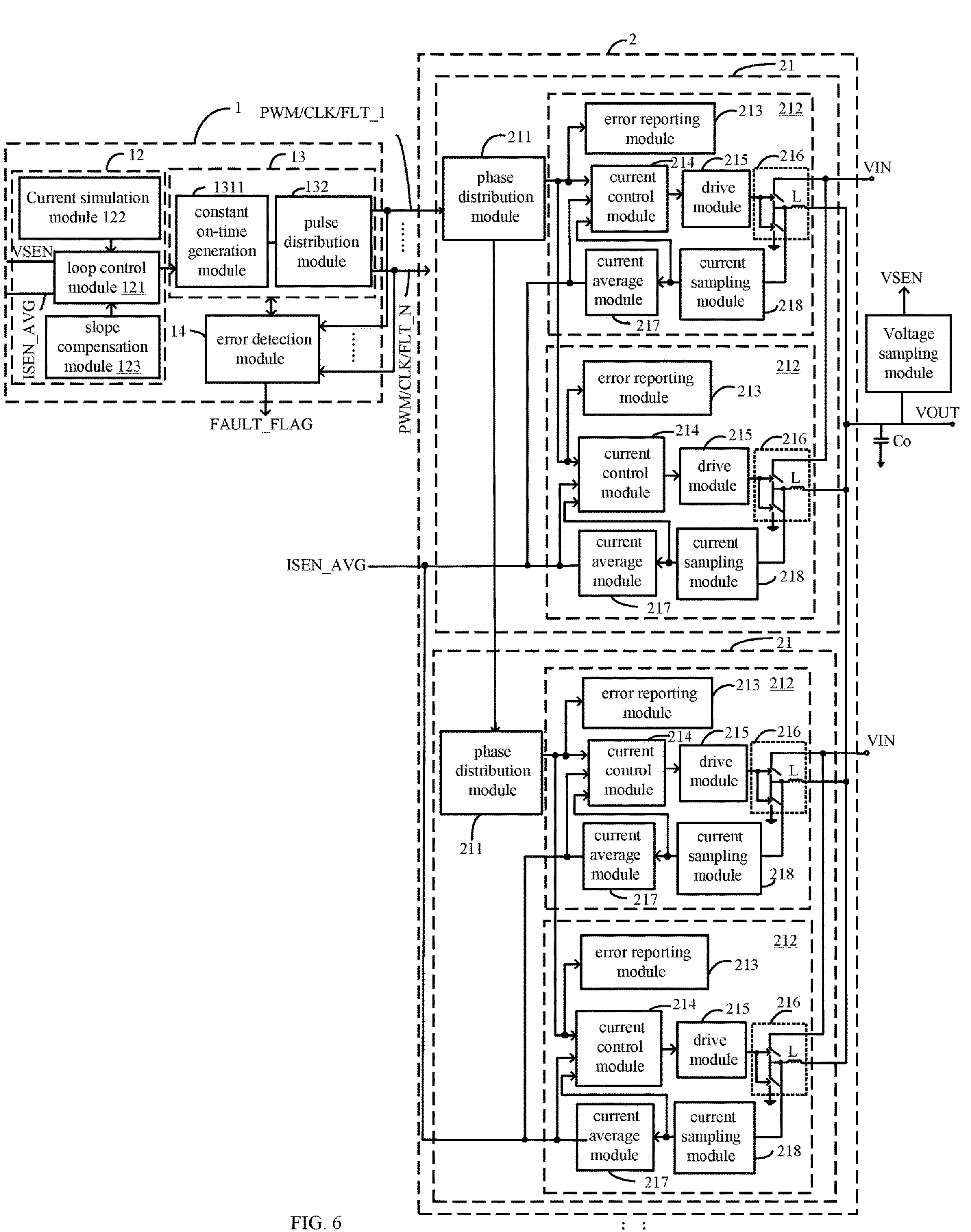
FIG. 6 is a schematic block diagram of a fourth example multi-phase voltage converter, in accordance with embodiments of the present invention.

Referring now to FIG. 6, shown is a schematic block diagram of a fourth example multi-phase voltage converter, in accordance with embodiments of the present invention. In this particular example, the multi-phase voltage converter can generate a PWM signal as the pulse distribution signal based on a ripple-based constant on-time loop control. Control chip 1 can include loop control and compensation module 12, pulse distribution signal generation module 13, and error detection module 14. Loop control and compensation module 12 can include slope compensation module 123, loop control module 121, and current simulation module 122. The ripple of the ripple-based constant on-time loop control can be obtained from the voltage feedback signal representing the output voltage of the multi-phase voltage converter, and the average current signal representing the average value of the inductor current of the power stage circuit. Current simulation module 122 can generate a simulated inductor current signal synchronized with the inductor current to increase loop stability and adjust loop dynamic response, and slope compensation module 123 can generate a slope signal to increase loop stability. Loop control module 121 can generate an output signal according to the voltage feedback signal representing the output voltage of the multi-phase voltage converter, the average current signal, the ramp signal, and the simulated inductor current signal.

In particular embodiments, pulse distribution signal generation module 13 can include constant on-time generation module 1311 and pulse distribution module 132. Constant on-time generation module 1311 can generate a PWM signal with a predetermined duty according to the output signal of loop control module 121 and a constant conduction time. Pulse distribution module 132 may distribute the pulses in the PWM signal to generate N interleaved pulse distribution signals, and distribute the N interleaved pulse distribution signals to each first-level conversion module 2. For example, the N phases of the pulse distribution signals may be interleaved, such that first-level conversion modules 2 can operate with an interleaved phase. Here, the ripple-based constant on-time control is taken as an example for illustration, and when other control modes are adopted, loop control and compensation module 12 and the PWM signal generation module may change accordingly.

As shown in FIG. 6, output terminals of all power stage circuits 216 can connect to output capacitor Co, which may serve as an output terminal of the multi-phase voltage converter. A voltage sampling module can connect to the output terminal of the multi-phase voltage converter, and can sample an output voltage of the multi-phase voltage converter to generate an output voltage feedback signal transmitted to pin VSEN. Each first-level conversion module 2 can include at least one second-level conversion module 21. As an example, each second-level conversion module 21 can include two parallel-connected third-level conversion modules 212, and each second-level conversion module 21 may be integrated into one chip. Each second-level conversion module 21 can also include phase distribution module 211, and phase distribution modules 211 in the same first-level conversion module 2 can connect in series. Each phase distribution module may perform phase shift or pulse extraction on the pulse distribution signal received by first-level conversion module 2, in order to obtain the first phase distribution signal for second-level conversion module 21, such that second-level conversion module 21 can operate in an interleaved phase. In this example, third-level conversion modules 212 in second-level conversion module 21 may operate in the same phase; that is, the second phase distribution signals received by third-level conversion modules 212 in second-level conversion module 21 can be the same as the first distribution signal.

In particular embodiments, the third-level conversion modules 212 in second-level conversion modules 21 can operate in the same phase or in interleaved phase. When the third-level conversion modules 212 operates in an interleaved phase, third-level conversion module 212 may also include a phase distribution module. The phase distribution modules in the third-level conversion modules can connect in series with each other. The phase distribution module may perform phase shift or pulse extraction based on the first phase distribution signal to generate the second phase distribution signal for the third-level conversion module, in order to control operation of power stage circuit 216.

As shown in FIG. 6, third-level conversion module 212 can include current average module 217, current sampling module 218, drive module 215, current control module 214, error reporting module 213, and power stage circuit 216 (e.g., a BUCK circuit). Current sampling module 218 can sense the inductor current of the BUCK circuit to generate the current sampling signal transmitted to current average module 217. The output terminals of all current average modules 217 can connect together, such that the average current signal representing the average value of the inductor current of power stage circuits 216 can be obtained, and the average current signal fed back to control chip 1 to realize functions such as loop control and protection. Current control module 214 can adjust a drive signal, and adjust pule widths of the second phase distribution signal according to the error between the average current signal and the corresponding current sampling signal. Current control module 214 can also generate the switch control signal as the input signal of drive module 215, thereby adjusting the on/off time of the switch in power stage circuit 216, and then adjusting the output signal of power stage circuit 216 to achieve current sharing. For example, current average module 217 can be configured as a resistor with the same resistance value. It should be understood that current average module 217 may also be other components capable of realizing current averaging.

As shown in FIG. 6, when a fault occurs in one third-level conversion module 212, control chip 1 can stop transmitting the pulse distribution signal, the signal line transmitting the second phase distribution signal can be multiplexed. Also, error reporting module 213 can control the signal line transmitting the second phase distribution signal to transmit different electrical signals to pins PWM/CLK/FLT1-PWM/CLK/FLTIN, in order to notice the control chip. Fault reports may include, but are not limited to over-current, over-temperature, device damage (e.g., open circuit or short circuit), and/or other faults. When different faults occur, the electrical signal at pins PWM/CLK/FLT1-PWM/CLK/FLTIN can change accordingly, and the error detection module 14 of control chip 1 can detect the electrical signals at N pins PWM/CLK/FLT_1-PWM/CLK/FLT_N to confirm the type of fault, and determine which first-level conversion module is faulty.

Figure 7:
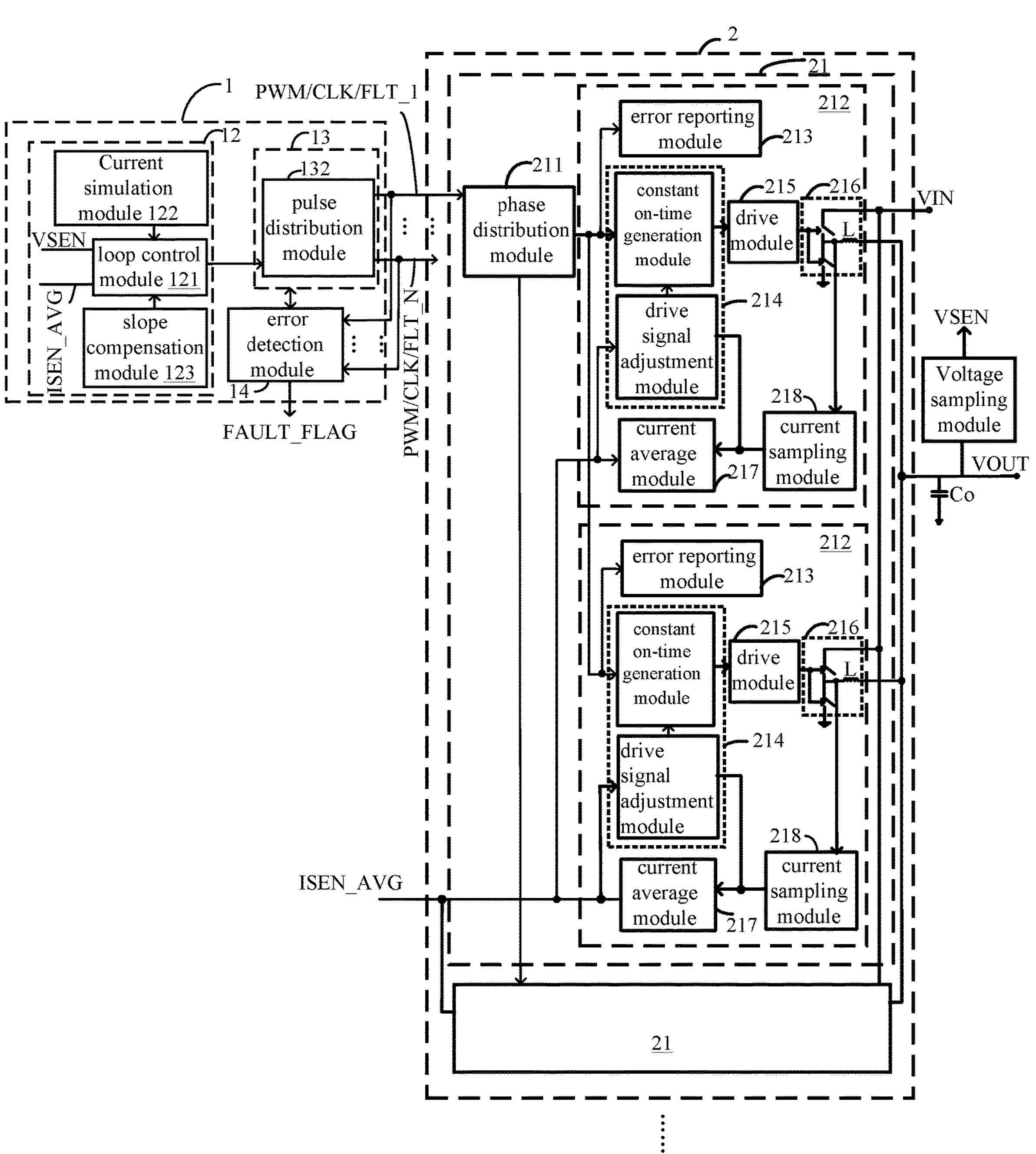
FIG. 7 is a schematic block diagram of a fifth example multi-phase voltage converter, in accordance with embodiments of the present invention.

Referring now to FIG. 7, shown is a schematic block diagram of a fifth example multi-phase voltage converter, in accordance with embodiments of the present invention. In this particular example, the pulse distribution signal is not a PWM signal, but a clock signal. Therefore, the composition of pulse distribution module 132 and current control module 214 is different from that of the examples in FIG. 6. Still taking the constant on-time control based on ripple as an example for illustration, in this particular example, pulse distribution signal generation module 13 can include pulse distribution module 132. Pulse distribution module 132 can generate N interleaved pulse distribution signals based on the output signal of loop control module 121. Current control module 214 in each third-level conversion module 212 can adjust and generate the drive signal of the power stage circuit. Current control module 214 can include a constant on-time generation module and a drive signal adjustment module, and can generate a PWM signal as an input signal of drive module 215. The drive signal adjustment module can adjust a preset turn-on time of the switch in the power stage circuit based on the error between the current sampling signal and the average current. The constant on-time generation module can generate a PWM signal as the switch control signal based on an output signal of the drive signal adjustment module and the corresponding second phase distribution signal, in order to control the turn-on or turn-off time of the switch in the power stage circuit.

As shown in FIG. 7, pulse distribution module 132 can generate the clock signal for each first-level conversion module 2 according to the control of the ripple-based constant on-time loop; that is, the pulse distribution signal in this example corresponds to the clock signal. For example, the phase of the clock signals are interleaved, each phase distribution module may perform phase shift or pulse extraction on the corresponding clock signal to output the corresponding second phase distribution signal. In this example, third-level conversion module 212 in the second-level conversion module may operate in the same phase, and the first phase distribution signal can be the same as the second phase distribution signal. For example, the output terminal of the phase distribution module in the second-level conversion module may directly be connected to each third-level conversion module. The drive signal adjustment module in each third-level conversion module 212 can adjust the preset turn-on time of the switch based on the error between the current sampling signal and the average current. The constant turn-on time generation module can generate the PWM signal for controlling the switch in the power stage circuit based on the adjusted turn-on time generated by the drive signal adjustment module and the clock signal.

In addition, it should be understood that in the embodiments in FIGS. 6 and 7, the loop control in the control chip is implemented based on the Ripple-Based Constant On-Time (RBCOT) mode. In other examples, the loop control module can also be implemented in a constant frequency mode and a Constant Off-Time (COT), according to the requirements. Pulse distribution signal generation module 13 or current control module 214 may also utilize the corresponding method to generate the PWM signal.

Figure 8:
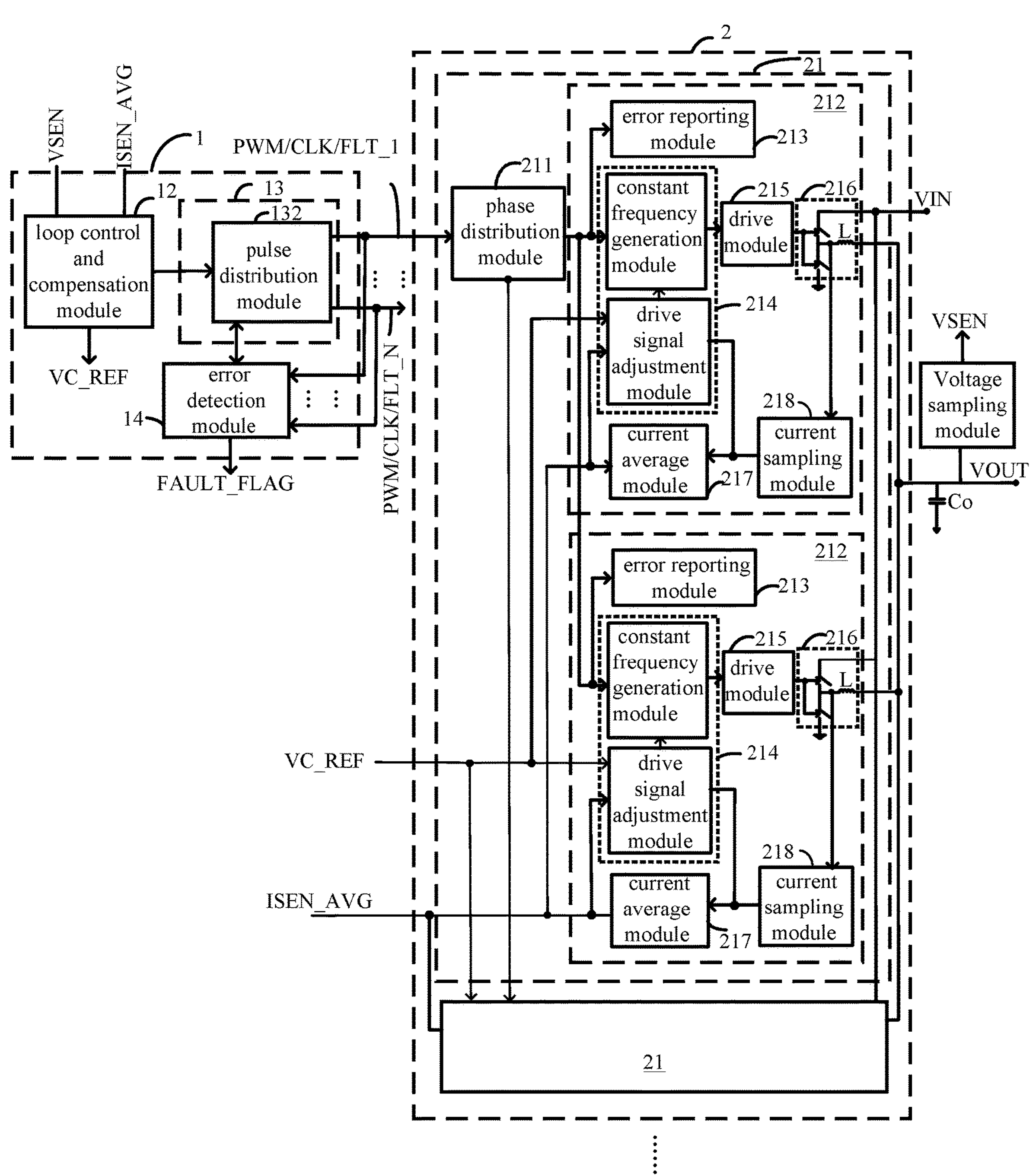
FIG. 8 is a schematic block diagram of a sixth example multi-phase voltage converter, in accordance with embodiments of the present invention.

Referring now to FIG. 8, shown is a schematic block diagram of a sixth example multi-phase voltage converter, in accordance with embodiments of the present invention. In this particular example, the multi-phase voltage converter can utilize a constant frequency control mode, whereby the pulse distribution signal in this example is a clock signal. Therefore, the composition of loop control and compensation module 12 and current control module 214 is different. Current control module 214 in each third-level conversion module 212 may adjust and generate the drive signal of the power stage circuit. Current control module 214 can include a constant frequency generation module and a drive signal adjustment module, and may generate a PWM signal as an input signal of drive module 215.

In particular embodiments, loop control and compensation module 12 can generate reference voltage signal VC_REF, and the drive signal adjustment module may adjust reference voltage signal VC_REF based on the error between the current sampling signal and the average current signal. The constant frequency generation module can generate the PWM signal for controlling the switches in the power stage circuit based on the adjusted reference voltage signal and the second phase distribution signal. As shown in FIG. 8, loop control and compensation module 12 can generate the clock signal according to the constant frequency loop control. Pulse distribution signal generation module 13 can generate N pulse distribution signals transmitted to each first level conversion module 2 according to the output signal of loop control and compensation module 12. For example, loop control and compensation module 12 can be controlled in a constant frequency mode such as Constant Frequency Voltage Mode or Constant Frequency Peak-Current Mode, according to particular requirements. In this example, the pulse distribution signal can correspond to a clock signal, where the phases of clock signals are interleaved. Each phase distribution module 211 may perform phase shift or pulse extraction on the pulse distribution signal to output the corresponding first phase distribution signal.

In particular embodiments, loop control and compensation module 12 can generate reference voltage signal VC_REF. As an example, reference voltage signal VC_REF can be generated by compensating the error between the voltage feedback signal representative of the output voltage of the multi-phase voltage converter and a reference voltage. The drive signal adjustment module may adjust reference voltage signal VC_REF based on the error between the current sampling signal and the average current signal to output the adjusted reference voltage signal. The adjusted reference voltage signal can indicate the duty cycle of the main switch in the power stage circuit. As such, the constant frequency signal generation module can generate a PWM signal with a constant frequency as an input signal of drive module 215 for controlling the switch in the power stage circuit based on the second phase distribution signal and the adjusted reference voltage signal. In FIG. 8, each third-level conversion module 212 may not include a phase distribution module, such that the second phase distribution signal is the same as the first phase distribution signal. For example, the second phase distribution signal can adjust a frequency of a triangle wave signal, the adjusted reference voltage signal and the triangle wave signal can be compared, in order to generate the PWM signal as the input signal of drive module 215.

In the above examples, first-level conversion modules 2 operate in interrelated phase, second-level conversion modules 21 also operate in interrelated phase, and the third-level conversion modules 212 in second-level conversion module 21 may operate in the same phase. It should be understood that each first-level conversion module 2, each second-level conversion module 21, and each third-level conversion module 212, can operate in the same phase or interrelated phase. When first-level conversion modules 2 operates in the same phase, the pulse distribution module in control chip 1 may only transmit, such that the input and output signals of the pulse distribution module 132 are the same. When each first-level conversion module 2 operates in interrelated phase, pulse distribution module 132 may perform pulse distribution for different phase to control each first-level conversion module 2 to operate in interrelated phase.

When second-level conversion modules 21 in the first-level conversion module 2 operates in an interrelated phase, each phase distribution module may perform phase shift or pulse extraction on the received pulse distribution signal to output the first phase distribution signals with interrelated phase, such that each second-level conversion module 21 operates in interrelated phase. Similarly, when second-level conversion modules 21 in first-level conversion module 2 operates in the same phase, each second-level conversion module 21 may no longer need phase distribution module 211, or each phase distribution module 211 may only play the role of signal transmission, such that each second-level conversion module 21 may receive the same first phase distribution signal to operate in the same phase, in order to operate in the same phase.

When third-level conversion modules 212 in second-level conversion module 21 operates in an interrelated phase, each third-level conversion module 212 can also include a phase distribution module. The phase distribution module in each third-level conversion module 212 may perform phase shift or pulse extraction on the received first-phase distribution signal, and output the second-phase distribution signal to control third-level conversion 21 to operate in interrelated phase. When third-level conversion modules 212 in second-level conversion module 21 operates in the same phase, each third-level conversion module 212 may no longer need the phase distribution module, or each phase distribution module in third-level conversion modules 212 may only play the role of signal transmission, such that each third-level conversion modules 212 may receive the same second phase distribution signal that is the same as the first phase distribution signal, in order to operate in the same phase.

In this way, particular embodiments may provide a multi-phase voltage converter, including a control chip having an output voltage feedback pin, an average current input pin, and N output pins, where N is a positive integer greater than 1. The output voltage feedback pin can receive the voltage feedback signal representing the output voltage of the multi-phase voltage converter. The average current input pin can receive the average current signal representing the average value of the inductor current of each power stage circuit. The control chip can output a pulse distribution signal to the corresponding first-level conversion module at each output pin according to the voltage feedback signal and the average current signal. Each first-level conversion module may receive the corresponding pulse distribution signal through the first terminal thereof. Each first-level conversion module can include at least one second-level conversion module, and each second-level conversion module can include at least one third-level conversion module. When each second-level conversion module includes multiple third-level conversion modules, the third-level conversion modules can connect in parallel with each other. The third-level conversion module can include a power stage circuit, a current sampling module and a current control module. The power stage circuit may receive the corresponding drive signal for power conversion, the current sampling module can generate a current sampling signal that characterizes the inductor current of the power stage circuit, and the current control module may receive the second phase distribution signal obtained based on the pulse distribution signal through the first terminal of the third-level conversion module, in order to control the generation of the drive signal, such that the current sampling signal is consistent with the average current signal.

The number of the first-level conversion modules, the second-level conversion modules, and the third-level conversion modules can be expanded in the scalable multi-phase voltage converter proposed. Increasing the number of the second-level conversion module and the third-level conversion module may not increase the number of external pins of the control chip and the first-level conversion module. In particular embodiments, each third-level conversion module in the multi-phase voltage converter can be internally installed the current average circuit. The output terminals of the current average circuit of each third-level conversion module can connect together to pin ISEN_AVG. The average current signal characterizing the average value of the inductor current of the power stage circuits can be generated, and the average current signal at pin ISEN_AVG may be fed back to control chip 1 to realize functions such as loop control and protection. Because the average current signal is normalized information, as compared to the example multi-phase voltage converter in FIG. 1, the multi-phase voltage converter in particular embodiments is easier to control and the peripheral circuits are more streamlined.

The control chip can manage N groups of interleaved and parallel-connected first-level conversion modules, and the number of pins required for control chip 1 to transmit the pulse distribution signals and the average current signal is (N+1). In one example, when in each first-level conversion module 2, M second-level conversion modules 21 connected in parallel may operate in interleaved phase, and in each second-level conversion module 212, K third-level conversion modules 212 connected in parallel may operate in interleaved phase. The example multi-phase voltage converter in FIG. 1 may need N*M*K*2 pins for transmitting the pulse distribution signals and current feedback signals. In this way, for the same number of phases of the conversion modules, the multi-phase voltage converter in particular embodiments may only need N+1 pins, and the number of the pins of the multi-phase voltage converter in the above examples can be greatly decreased. Therefore, under applications of high phase number, the package size cost of control chip 1 is lower and more competitive, and the layout and routing are easier.

The third-level conversion module can be internally installed the current average circuit. Based on the current information sensed from each third-level conversion module and the average current information obtained on pin ISEN_AVG, the current sharing mechanism can be realized. In this way, each third-level conversion module can achieve current sharing, and the current sharing mechanism is more accurate than the traditional multi-phase voltage converter architecture. Particular embodiments may multiplex the signal line that transmits the pulse distribution signal and the phase distribution signal to detect the fault signal occurred by each first-level conversion module, which can greatly reduce the number of pins of the control chip. The error detection function of particular embodiments can detect which first-level conversion module is faulty. However, traditional multi-phase voltage converters may only know the power conversion module has a fault, and not which phase of the conversion module has a fault. Therefore, the error detection function of particular embodiments is more targeted than the traditional voltage converter.

The embodiments were chosen and described in order to best explain the principles of the invention and its practical applications, to thereby enable others skilled in the art to best utilize the invention and various embodiments with modifications as are suited to particular use(s) contemplated. It is intended that the scope of the invention be defined by the claims appended hereto and their equivalents.

What is claimed is:

1. A multi-phase voltage converter, comprising:

a) a control chip configured to generate N pulse distribution signals, wherein Nis a positive integer greater than 1;

b) a power conversion module comprising N first-level conversion modules;

c) wherein each first-level conversion module comprises at least one second-level conversion module, and each second-level conversion module comprises at least one third-level conversion module;

d) wherein when each second-level conversion module comprises multiple third-level conversion modules, each of the multiple third-level conversion modules are coupled in parallel with each other;

e) wherein the first-level conversion module receives a corresponding one of the N pulse distribution signals, the second-level conversion module receives a first phase distribution signal generated based on the corresponding pulse distribution signal, and each third-level conversion module receives a second phase distribution signal generated based on the first phase distribution signal;

f) wherein each third-level conversion module comprises a control circuit and a power stage circuit, wherein the control circuit is configured to generate an average current signal at a first output terminal thereof according to a current sampling signal characterizing an inductor current of the power stage circuit, and each first output terminal of each control circuit of each of the third-level conversion modules in the power conversion module are connected together; and g) wherein the control chip is configured to receive the average current signal, and to adjust the N pulse distribution signals based on the average current signal.

2. The multi-phase voltage converter of claim 1, wherein when each second-level conversion module in one first-level conversion module operates in a same phase, the first phase distribution signal is consistent with a corresponding pulse distribution signal, and the second-level conversion modules receive the corresponding pulse distribution signal received by the corresponding first-level conversion module.

3. The multi-phase voltage converter of claim 1, wherein when each of the third-level conversion modules in one second-level conversion module operate in the same phase, the second phase distribution signal is consistent with a corresponding first phase distribution signal, and the third-level conversion modules receive the corresponding first phase distribution signal received by the corresponding second-level conversion module.

4. The multi-phase voltage converter of claim 1, wherein the control circuit comprises a current average module, the current average module is configured to perform an averaging operation for the current sampling signal to generate the average current signal.

5. The multi-phase voltage converter of claim 1, wherein the control circuit comprises a current control module that is configured to control at least one switch in the power stage circuit to be turned on and off based on an error between the current sampling signal and the average current signal.

6. The multi-phase voltage converter of claim 5, wherein the current control module is configured to adjust the second phase distribution signal based on the error between the average current signal and the current sampling signal, in order to generate a switch control signal for controlling at least one switch in the power stage circuit.

7. The multi-phase voltage converter of claim 5, wherein the current control module is configured to generate a reference signal for controlling a turn-on time or a turn-off time of at least one switch in the power stage circuit based on the error between the average current signal and the current sampling signal, and to generate a PWM signal as a switch control signal for controlling the at least one switch based on an adjusted reference signal and the second phase distribution signal.

8. The multi-phase voltage converter of claim 1, wherein the second-level conversion modules in one first-level conversion module operate in either the same phase or the interleaved phase.

9. The multi-phase voltage converter of claim 1, wherein the third-level conversion modules in one second-level conversion module operate in either the same phase or the interleaved phase.

10. The multi-phase voltage converter of claim 1, wherein when the power conversion module has a fault, the first-level conversion module stops power conversion, and the power conversion module transmits fault information to the control chip through signal lines transmitting the N pulse distribution signals.

11. The multi-phase voltage converter of claim 1, wherein:

a) each third-level conversion module comprises an error reporting module that is configured to monitor states of each third-level conversion module; and
b) when a fault occurs, each third-level conversion module stops power conversion, and the power conversion module modifies electrical signals on the signal lines transmitting the N pulse distribution signals along signal lines transmitting the second and first phase distribution signals according to types of the fault, in order to transmit different electrical signals to the control chip.

12. The multi-phase voltage converter of claim 1, wherein the control chip comprises an error detection module configured to determine in which first-level conversion module a fault occurs and which type of fault by monitoring electrical signals at signal lines transmitting the N pulse distribution signals.

13. A multi-phase voltage converter, comprising:

a) a control chip configured to generate N pulse distribution signals, wherein N is a positive integer greater than 1;
b) a power conversion module comprising N first-level conversion modules;
c) wherein each first-level conversion module comprises at least one second-level conversion module, and each second-level conversion module comprises at least one third-level conversion module;
d) wherein when each second-level conversion module comprises multiple third-level conversion modules, each of the multiple third-level conversion modules are coupled in parallel with each other;
e) wherein the first-level conversion module receives a corresponding one of the N pulse distribution signals, the second-level conversion module receives a first phase distribution signal generated based on the corresponding pulse distribution signal, and each third-level conversion module receives a second phase distribution signal generated based on the first phase distribution signal; and
f) wherein the control chip comprises an output voltage feedback pin configured to receive a voltage feedback signal representing an output voltage of the multi-phase voltage converter, an average current input pin configured to receive an average current signal characterizing an average value of an inductor current of a power stage circuit generated by each of the third-level conversion modules, and N output pins configured to generate the N pulse distribution signals according to the average current signal and the voltage feedback signal.

14. A multi-phase voltage converter, comprising:

a) a control chip configured to generate N pulse distribution signals, wherein N is a positive integer greater than 1;
b) a power conversion module comprising N first-level conversion modules;
c) wherein each first-level conversion module comprises at least one second-level conversion module, and each second-level conversion module comprises at least one third-level conversion module;
d) wherein when each second-level conversion module comprises multiple third-level conversion modules, each of the multiple third-level conversion modules are coupled in parallel with each other;
e) wherein the first-level conversion module receives a corresponding one of the N pulse distribution signals, the second-level conversion module receives a first phase distribution signal generated based on the corresponding pulse distribution signal, and each third-level conversion module receives a second phase distribution signal generated based on the first phase distribution signal; and
f) wherein each of the second-level conversion modules other than an output inductor and an output capacitor of a power stage circuit in the third-level conversion module is integrated into a chip, the chip comprising a signal receiving pin configured to receive the first phase distribution signal, a power input pin configured to receive a supply voltage to supply power to the chip, an average current output pin configured to generate an average current signal characterizing an average value of an inductor current of a power stage circuit generated by each of the third-level conversion modules, and multiple output pins configured to respectively couple to an output capacitor or an output inductor of the power stage circuit in each third-level conversion module, wherein a number of the output pins is the same as a number of the third-level conversion modules.

15. A multi-phase voltage converter, comprising:

a) a control chip configured to generate N pulse distribution signals, wherein N is a positive integer greater than 1;

b) a power conversion module comprising N first-level conversion modules;

c) wherein each first-level conversion module comprises at least one second-level conversion module, and each second-level conversion module comprises at least one third-level conversion module;

d) wherein when each second-level conversion module comprises multiple third-level conversion modules, each of the multiple third-level conversion modules are coupled in parallel with each other;

e) wherein the first-level conversion module receives a corresponding one of the N pulse distribution signals, the second-level conversion module receives a first phase distribution signal generated based on the corresponding pulse distribution signal, and each third-level conversion module receives a second phase distribution signal generated based on the first phase distribution signal; and f) wherein each of the third-level conversion modules other than an output inductor and an output capacitor of a power stage circuit in the third-level conversion module is integrated into a chip, the chip comprising a signal receiving pin configured to receive the second phase distribution signal, a power input pin configured to receive a supply voltage to supply power to the chip, an average current output pin configured to generate an average current signal characterizing an average value of an inductor current of a power stage circuit in the third-level conversion module, and multiple output pins configured to respectively couple to an output capacitor or an output inductor of the power stage circuit.

16. A multi-phase voltage converter, comprising:

a) a control chip configured to generate N pulse distribution signals, wherein N is a positive integer greater than 1;

b) a power conversion module comprising N first-level conversion modules;

c) wherein each first-level conversion module comprises at least one second-level conversion module, and each second-level conversion module comprises at least one third-level conversion module;

d) wherein when each second-level conversion module comprises multiple third-level conversion modules, each of the multiple third-level conversion modules are coupled in parallel with each other;

e) wherein the first-level conversion module receives a corresponding one of the N pulse distribution signals, the second-level conversion module receives a first phase distribution signal generated based on the corresponding pulse distribution signal, and each third-level conversion module receives a second phase distribution signal generated based on the first phase distribution signal; and f) wherein the control chip comprises a loop control and compensation module configured to perform loop control, compensation, and protection based on an average current signal and a voltage feedback signal, a pulse distribution signal generation module configured to generate the N pulse distribution signals according to an output signal of the loop control and compensation module, and wherein the average current signal represents an average value of an inductor current of a power stage circuit generated by each of the third-level conversion modules, and wherein the voltage feedback signal represents an output voltage of the multi-phase voltage converter.

17. The multi-phase voltage converter of claim 16, wherein the pulse distribution signal generation module comprises:

a) a PWM signal generation module configured to generate a PWM signal according to the output signal of the loop control and compensation module; and b) a pulse distribution module configured to distribute pulses in the PWM signal to generate N interleaved pulse distribution signals.

18. The multi-phase voltage converter of claim 16, wherein the pulse distribution signal generation module comprises a pulse distribution module configured to distribute pulses in the output signal of the loop control and compensation module to generate N interleaved pulse distribution signals.

* * * * *